(12) United States Patent
Shimizu

(10) Patent No.: US 8,395,995 B2
(45) Date of Patent: Mar. 12, 2013

(54) SIGNAL PATTERN GENERATION APPARATUS, SIGNAL PATTERN GENERATION METHOD, PROGRAM FOR MAKING COMPUTER SYSTEM EXECUTE THE SIGNAL PATTERN GENERATION METHOD, COMPUTER-READABLE STORAGE MEDIUM ON WHICH THE PROGRAM IS STORED, NETWORK ENDURANCE TESTING SYSTEM, AND NETWORK ENDURANCE TESTING METHOD

(75) Inventor: Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2086 days.

(21) Appl. No.: 11/244,493

(22) Filed: Sep. 30, 2005

(65) Prior Publication Data

US 2006/0109791 A1 May 25, 2006

(51) Int. Cl.
*H04L 12/26* (2006.01)
(52) U.S. Cl. ........................................ 370/241
(58) Field of Classification Search ............ 370/241, 370/290, 292; 600/27, 306, 300, 301
See application file for complete search history.

(56) References Cited

U.S. PATENT DOCUMENTS

| 6,249,749 | B1 * | 6/2001 | Tran et al. ...................... 702/66 |
| 6,973,124 | B2 * | 12/2005 | Miller ............................ 375/222 |
| 7,315,386 | B1 * | 1/2008 | Shiimori et al. .............. 358/1.15 |
| 2005/0058302 | A1 * | 3/2005 | Dance et al. .................. 381/94.7 |

OTHER PUBLICATIONS

Takashi Sasaki, "Technical Report of IEICE, IN2000-34" Jun. 2, 2000.
Akira Sano, "The Institute of Systems, Control and Information Engineers Report vol. 42, No. 2, pp. 55-63" Feb. 15, 1998.
E.E.Kuruoglu, "Density Parameter Estimation of Skewed alpha-Stable Distributions", IEEE Trans. on Signal Processing, vol. 49, No. 10, pp. 2192-02201 Oct. 1, 2001.
Yasuhiro Suzuki el,Nikkei Technology, vol. 51, pp. 110-118 Sep. 22, 2001.

* cited by examiner

*Primary Examiner* — Man Phan
*Assistant Examiner* — Nourali Mansoury
(74) *Attorney, Agent, or Firm* — Cantor Colburn LLP; Vazken Alexanian

(57) ABSTRACT

[Object]
To generate a signal pattern generation apparatus capable of performing suitable processing even when an abrupt increase in the number of accesses occurs while the number of accesses is large, having an adequate long-tail characteristic, and capable of providing adequate fractality with respect to a plurality of ranges with respect to time and providing a suitable short-range distribution characteristic.
[Solution]
A signal pattern generation apparatus of the present invention is constituted by a root signal generation section 12 which generates a root signal of a long-tail distribution having positivity, a statistical self-similarity signal generation section SSSSG which generates a statistical self-similarity signal based on wavelet analysis from the root signal, a general-filter section 20 which decomposes the statistical self-similarity signal into at least two intermediate patterns, a coefficient acquisition section 22 which obtains coefficients for the two intermediate patterns, and a resynthesis section 24 which generates a resynthesized pattern from the two intermediate patterns and the obtained coefficients.

10 Claims, 12 Drawing Sheets

(a)

(b)

(a)

(b)

(a)

(b)

SIGNAL PATTERN GENERATION APPARATUS, SIGNAL PATTERN GENERATION METHOD, PROGRAM FOR MAKING COMPUTER SYSTEM EXECUTE THE SIGNAL PATTERN GENERATION METHOD, COMPUTER-READABLE STORAGE MEDIUM ON WHICH THE PROGRAM IS STORED, NETWORK ENDURANCE TESTING SYSTEM, AND NETWORK ENDURANCE TESTING METHOD

CROSS REFERENCE and PRIORITY

This application filed under 35 USC 371, is cross-referenced with, and claims priority from, International Patent Application JP2004/003802 filed on Mar. 19, 2004, and published in Japanese with Publication No.PCT WO 2004/091142 Al on Oct. 21, 2004, under PCT article 21(2), which in turn claims priority of JP2003-098194, filed on Apr. 1, 2003.

DETAILED DESCRIPTION OF THE INVENTION

1. Field of the Invention

The present invention relates to generation of a signal pattern and, more particularly, to a signal pattern generation apparatus capable of performing suitable processing even when an abrupt increase in the number of accesses occurs while the number of accesses is large, having an adequate long-tail characteristic, and capable of providing adequate fractality with respect to a plurality of ranges with respect to time and providing a suitable short-range distribution characteristic, a signal pattern generation method capable of providing such characteristics, a program for making a computer system execute the signal pattern generation method, a computer-readable storage medium on which the program is stored, a network endurance testing system, and a network endurance testing method.

2. Background Art

In recent years, networks of computer systems have come into general use. In networks via infrastructures including the Internet, there is a need to evaluate the reliability and durability of a system in advance with respect to accesses to a server constituting Web sites or the like. Evaluations of the reliability and durability of a system under such circumstances are made, for example, as to what degree of endurance does the designed system have, whether the system has an optimum configuration such as to be able to maintain a constant processing speed, and which amount of system resources are to be supplemented. Making these evaluations by actually forming the system and evaluating the system during runtime in actual use is inappropriate in terms of the value or importance of information communicated via a network. Therefore, it is desirable that the above-mentioned network endurance of a server, etc., be evaluated in advance through a simulation. Also, the degree of tuning of the response of a server actually offering a Web service or a Web application may be determined by performing a simulation with the actual frequency of access, etc., in order to improve the response of the server. If this determination can be made, tuning can be performed in a non-try-and-error manner with high efficiency. Thus, in either case, it is preferable that a simulation of a particular server with respect to the network endurance be made possible.

A simulation is one of effective means for analyzing and predicting the end-to-end performance of a computer system in a network, e.g., a Web site made complicated as described above. To achievement of the above-described simulation, an approach of analyzing the response time on the basis of a queuing theory or the like has been adopted. However, in a case where the entire system including end users and a server site is complicatedly formed, modeling of based on a queuing theory is not necessarily appropriate and there is a need to analyze and predict the behavior of the system by a simulation based on detailed modeling of the network, end users and server. In a simulation, if a system configuration to be analyzed and predicted is determined, analysis and prediction is performed by obtaining output information about the system in such a manner that the entire system is made to operate while a time-series pattern prescribed according to certain stochastic and statistical characters are input thereto. Feedback information for automatic reconfiguration and automatic optimization of the system, for example, can be obtained therefrom.

When the reliability and durability (hereinafter referred to collectively as "endurance" in the description of the present invention) of a system is analyzed and evaluated through a simulation, it is necessary to assume, from an example of access patterns actually measured, a stochastic model reflecting characters of the access pattern and to make trials relating to various cases by generating a multiplicity of artificial access patterns. In particular, important characteristics required of access patterns used in a simulation of a high-volume Web site (HVWS) or the like, are such that statistical self-similarity and a long-tail distribution characteristic which change every moment and a distribution characteristic as seen in a comparatively short term form a signal pattern which can be said to be stochastically/statistically equivalent to a target measured example.

Various studies have been made about the above-described patterns of access through a network. For example, in a document by Willinger et al. (W. Willinger, M. S. Taqqu, R. Sherman, and D. V. Wilson, "Self-Similarity Through High-Variability: Statistical Analysis of Ethernet® LAN Traffic at the Source Level," IEEE/ACM Trans. Networking, Vol. 5, No. 1, pp. 71-86, February 1997) and other documents, it is pointed out that characters including a statistical self-similarity, a bursting character and long-range dependence exist in network traffic, and that stochastic expression of traffic by a Poisson distribution or a Markov model is insufficient. Studies on adopting statistical fractality in analysis and simulation of network traffic have thereafter been made. Further, it is pointed out in a document by Crovella et al. (M. E. Crovella and A. Bestavros, "Self-Similarity in World Wide Web Traffic: Evidence and Possible Causes," IEEE/ACM Trans. Networking, vol. 5, No. 6, pp. 835-846, December 1997) that the above-mentioned fractality is a character widely existing not also in Traffic in LANs or the like but also in patterns of access to Internet-related servers relating in WWW or the like.

A typical time-series signal which has been studied as a time-series pattern having the above-mentioned fractality is a fractional Brownian motion (fBm) and various methods for generating such a signal have been studied. However, statistical characterization of traffic or access patterns relating to a computer network system such as one to which the present invention is applied has not been reliably made by using any of those studied methods.

One reason for this is that fBm is incapable of maintaining positivity, which is one of traffic and access characteristics. Positivity means a distribution which reliably returns a positive value when an independent variable is positive, and which does not involve a case in which the independent variable is negative. The second reason is that in the fBm signal one self-similarity parameter (Hurst parameter) is assumed with respect to an observation range and it is thought that, in a time-series pattern to be generated in accordance with the present invention, a self-similarity parameter changes with time in an observation range or a plurality of self-similarity parameters exist in an observation range. Indeed, according to a document by Gilbert et al. (A. C. Gilbert, W. Willinger, and A. Feldman, "Scaling Analysis of Conservative Cascades with Applications to Network Traffic," IEEE Trans. Information Theory, Vol. 45, No. 3, pp. 971-991, April 1999), etc., analyses have been made by assuming that multifractality such as described above exists in Internet traffic. The third reason is that in the case of fBm no consideration is given to adaptability of a short-range distribution to the original pattern.

As described above, a time-series signal having a plurality of Hurst parameters in an observation range as described above is referred to as a signal having multifractality in a broad sense. A method of generating network traffic having the above-described multifractality, long-tail-distributed and having positivity maintained to a certain degree is disclosed in a document by Riedi et al. (R. H. Riedi, M. S. Crouse, V. J. Ribeiro, and R. G. Baraniuk, "A Multifractal Wavelet Model with Application to Network Traffic," IEEE Trans. Information Theory, Vol. 45, No. 3, pp. 992-1018, April 1999). Riedi et al. proposed a method of performing a simulation by a technique using wavelets. In a signal pattern generated by this technique, however, there is a strong possibility of an error being included in a pattern distribution as seen in a short range.

More detailed description will be made of this. A method of generating a long-tail positive multifractal signal is proposed in the above-mentioned document by Riedi et al. The method by Riedi et al. is as outlined below. Steps shown in the flowchart of FIG. 12 is repeated to a given number n to finally obtain a series:

$$\{C^{(n)}[k]=2^{-n/2}U_{n,k}|k=0,1,\ldots,2^n-1\} \quad \text{[Expression 1]}$$

as a target signal pattern X[k].

However, the results of a detailed analysis made by the inventors of the present invention show that this technique has two problems. The first problem is that a root signal is generated as a random time series according to a Gaussian distribution in the process shown in FIG. 12. Essentially, a root signal bears a lowest frequency component of a target signal. In such a case, it is appropriate that its positivity is maintained not only in the generated signal but also in the root signal. In the case of generation of a time series from a Gaussian distribution, however, its positivity is not ensured. Therefore, a cause of increase in error on the low-frequency side in the entire distribution finally obtained is given as a seed of a signal pattern generation. An error from the observed signal is necessary caused thereby.

The second problem is that there is a possibility of accumulation of error by repeated computation of $U_{j,k}$ and $W_{j,k}$. This accumulation of error can be explained as in the following. The steps shown in FIG. 12 are derived on the basis of wavelet decomposition shown by the following equation:

$$X(t) = \sum_k U_{J_0,k}\phi_{J_0,k}(t) + \sum_{j=J_0}^{\infty}\sum_k W_{j,k}\psi_{j,k}(t) \quad \text{[Expression 2]}$$

wherein $$W_{j,k}=\int X(t)\psi_{j,k}(t)dt$$

$$U_{j,k}=\int X(t)\phi_{j,k}(t)dt \quad \text{[Expression 3]}$$

Also, $\psi_{j,k}$ and $\phi_{j,k}$ are defined as the following equations by using a band-pass wavelet function $\psi(t)$ and a low-pass scaling function $\phi(t)$:

$$\psi_{j,k}(t)=2^{j/2}\psi(2^jt-k)$$

$$\phi_{j,k}(t)=2^{j/2}\phi(2^jt-k) \quad \text{[Expression 4]}$$

Therefore, the method by Riedi et al. entails a problem that once an error from an actual signal occurs, it is accumulated mainly in a signal corresponding to low-frequency components, while a positive long-tail time-series pattern having multifractality is generated. More specifically, due to this problem, a phenomenon occurs in which time-series patterns corresponding to low-frequency components and not varying largely are dominant and patterns exhibiting fine changes and high-frequency components representing fine changes are not well reflected in the final pattern. Thus, a disadvantage of the method according to the document by Riedi et al. is difficulty in making a pattern distribution representing an abrupt change in a pattern when the pattern is observed in a short range. In the description of the present invention, "low-frequency component" and "high-frequency component" are terms used specifically in correspondence with the access frequency for discrimination of components extracted in a general-purpose filter capable of being formed as a nonlinear filter. Therefore, the terms "low-frequency component" and "high-frequency component" do not immediately denote that the signal pattern in accordance with the present invention is data such as image or audio data including a time variable.

This means, with respect to traffic patterns, that a pattern expressing an abrupt change such as one due to abrupt occurrence of a large-scale access is relatively weak. If time-series patterns generated by the method proposed by Riedi et al. are used for a simulation of a site where the number of accesses changes abruptly and largely, a prediction result different from the actual condition is obtained, which is undesirable.

An abrupt large change in the number of accesses occurs, for example, in the above-mentioned computer system called HVWS. A typical example is an event site which provides information about an event such as the Olympic games over the Internet. In a simulation of the behavior of a server or the like in HVWS, therefore, it is particularly important to generate and use patterns having multifractality and a long-tail distribution characteristic and also having a distribution which reflects stochastic and statistical characters in a short range such that a substantially large number of accesses occurs abruptly. There has been provided no method or apparatus for generating patterns by estimating stochastic and statistical characters from actually-measured data such that above-described characteristics are reflected.

There are other examples of methods of generating access patterns having a positive long-tail distribution, which are a method of convolving an α-stable distribution and a method of using an fARIMA (fractional AutoRegressive-Integrated Moving Average) model in which the short-range and the long-range dependencies can be considered. However, multifractality is not referred to in any of these examples.

As a feature of HVWS, a fact that the degrees of a plurality of characteristic distributions in patterns vary depending on locational and time conditions is also pointed out in a document by Squillante et al. (M. S. Squillante, D. Yao, and L. Zhang, "Web Traffic Modeling and Web Server Performance Analysis," IEEE Proc. The $38_{th}$ Conf. on Decision & Control, pp. 4432-4439, December 1999). However, there has been provided no generation method or apparatus capable of easily performing suitable processing with respect to such distribution variations.

PROBLEMS TO BE SOLVED BY THE INVENTION

An object of the present invention is to provide a signal pattern generation apparatus capable of performing suitable processing even when an abrupt increase in the number of accesses occurs while the number of accesses is large, having an adequate long-tail characteristic, and capable of providing adequate fractality with respect to a plurality of ranges with respect to time and providing a suitable short-range distribution characteristic, a signal pattern generation method capable of providing such characteristics, a program for making a computer system execute the signal pattern generation method, a computer-readable storage medium on which the program is stored, a network endurance testing system, and a network endurance testing method.

SUMMARY OF THE INVENTION

The present invention has been achieved on the basis of a finding that the above-described problem of the conventional art can be solved by adding a suitable range distribution characteristic to a signal having multifractality of a long-tail distribution formed of positive values. According to the present invention, modeling of a root signal is first performed by using as a probability distribution an α-stable distribution in which positivity is ensured. Further, components corresponding to low-frequency components and high-frequency components are extracted from the signal having multifractality by a nonlinear filter. A resynthesis of the components is performed by changing the intensities of the components. According to the present invention, the above-described arrangement is adopted to enable the ratios of the low-frequency components and the high-frequency components to be set as parameters. That is, according to the present invention, a user can easily change the ratio of the signal values of a long-range dependence and a short-range dependence. Thus, a signal pattern can be provided which enables a simulation of network endurance to be performed easily with improved accuracy. That is, the present invention solve the above-described problem by generating a signal pattern having the above-described time-series characteristics and having stochastic and statistical characteristics close to actually measured data.

That is, according to the present invention, there is provided a signal pattern generation apparatus which generates a signal pattern having statistical self-similarity, the apparatus including:

a root signal generation section which generates a root signal;

a statistical self-similarity signal generation section which generates a statistical self-similarity signal based on wavelet analysis from the root signal;

a decomposition section which decomposes the statistical self-similarity signal into at least two intermediate patterns;

a coefficient acquisition section which obtains coefficients for the two intermediate patterns; and a resynthesis section which generates a resynthesized pattern from the two intermediate patterns and the coefficients.

According to the present invention, the above-described root signal generation section includes means of generating the root signal by reading out an α-stable distribution function. According to the present invention, the above-described statistical self-similarity signal generation section is formed so as to include a filter bank section formed in a software or hardware manner. Also, the above-described decomposition section includes a general-purpose filter including at least a non-linear filter. Further, the above-described coefficient acquisition section includes means of storing coefficients computed from the ratios of the at least two intermediate patterns, or coefficients externally input.

According to the present invention, there is provided a signal pattern generation method in which a computer is controlled to generate a signal pattern having statistical self-similarity, the method causing the computer to execute:

a step of generating a root signal;

a step of generating a statistical self-similarity signal based on wavelet analysis from the root signal;

a step of decomposing the statistical self-similarity signal into at least two intermediate patterns;

a step of obtaining coefficients for the two intermediate patterns; and a step of obtaining a resynthesized pattern from the two intermediate patterns and the coefficients.

According to the present invention, there is provided a computer-executable program for executing a signal pattern generation method in which a computer is controlled to generate a signal pattern having statistical self-similarity, the program causing the computer to functionally form:

means of generating a root signal;

means of generating a statistical self-similarity signal based on wavelet analysis from the root signal;

means of decomposing the statistical self-similarity signal into at least two intermediate patterns;

means of obtaining coefficients for the two intermediate patterns; and means of obtaining a resynthesized pattern from the two intermediate patterns and the coefficients.

According to the present invention, there is provided a network endurance testing system including:

a signal pattern generation section which generates a resynthesized signal pattern having statistical self-similarity;

an access request generation section which receives the resynthesized signal pattern generated from the signal pattern generation section and generating a time-series access request; and an information processing section which receives the access request from the access request generation section, executes processing according to the request, and stores an execution log.

According to the present invention, there is provided a method of evaluating transaction processing characteristics of a Web server using a network endurance testing system including a signal pattern generation section which generates a resynthesized signal pattern having statistical self-similarity, an access request generation section which receives the resynthesized signal pattern generated from the signal pattern generation section and generating a time-series access request, and an information processing section which receives the access request from the access request generation section and executes processing according to the request, the method including:

a step of sending out the resynthesized signal from the signal pattern generation section;

a step of generating the time-series access request from the synthesized signal pattern in the access request generation section, and sending out the access request to the Web server; and a step of executing processing in response to the access request in the Web server and obtaining an execution log.

PREFERRED EMBODIMENT

An embodiment of the present invention will be described as a particular mode of implementation by considering network traffic. However, techniques proposed below are not limited to an application to a network. The present invention can also be applied to local access patterns or transaction communication patterns at an end user or a server site.

In a case where patterns of accesses or a transaction communication patterns in a network are used in a simulation, it is desirable that stochastic and statistical characters of an input pattern coincide with an example of an actual measurement of a system to be examined, and the character has an important basic role in following automatic optimization of system.

As characters of traffic patterns necessary in HVWS to which the present invention is applied, positivity, multifractality, a long-tail distribution characteristic, coexistence of a long-range dependence and a short-range dependence, etc., are required.

FIG. 1 is a flowchart in which processing in accordance with a signal pattern generation method of the present invention is outlined. A multifractal signal of a long-tail distribution having positivity is generated in step S10. Next, in step S12, component separation of low-frequency components and high-frequency components is performed by using a general-purpose filter, e.g., a nonlinear filter or a linear filter to form a signal pattern referred to as an intermediate pattern. This intermediate pattern can be changed as desired according to the characteristics of the general-purpose filter used, etc. According to the present invention, an intermediate pattern is generated from the signal pattern generated as described above to enable weighting on the components.

In the description of the present invention, the term "general-purpose filter" denotes a filter which can be formed in a software manner to be used as a linear filter or a nonlinear filter as desired. However, there is no intention to exclude, from the present invention, use of a filter formed in a hardware manner. In step S14, weights given to low-frequency components and high-frequency components are computed. In step S16, the ratios (weights) of the components are changed and a signal pattern is regenerated. The low-frequency and high-frequency components are thereby combined in ratios selected as desired to generate a resynthesized signal pattern. After generation of the signal pattern by the above-described processing, the execution of the signal pattern generation method of the present invention ends in step S18.

FIG. 2 shows an example of a flowchart usable for generation of the multifractal signal in step S10 shown in FIG. 1. As shown in FIG. 2, to generate the multifractal signal in accordance with the present invention, $j=J_0$ is set in step S20 and a root signal is generated with respect to variable $k=0, 1, \ldots, 2^j-1$ by using one-dimensional $\alpha$-stable distribution. The $\alpha$-stable distribution is given by a function shown by the following equation:

$$\psi(t) = \begin{cases} \exp\left\{j\mu t - \gamma|t|^\alpha\left[1 + j\beta\mathrm{sign}(t)\tan\left(\frac{\alpha\pi}{2}\right)\right]\right\}, \\ \text{if } \alpha \neq 1 \\ \exp\left\{j\mu t - \gamma|t|^\alpha\left[1 + j\beta\mathrm{sign}(t)\frac{2}{\pi}\log|t|\right]\right\}, \\ \text{if } \alpha = 1 \end{cases} \quad \text{[Expression 5]}$$

In the above equation, $\alpha \in (0, 2]$ is a characteristic exponent representing the thickness of the tails. The case where $\alpha=2$ corresponds to a Gaussian distribution. In the above notation, "(" denotes that the adjacent value on the right-hand side is not included, and "]" denotes that the adjacent value on the left-hand side is included. Also, $\beta \in [-1, 1]$ is a symmetry parameter representing the skewness. When $\beta=0$, a symmetry about $\mu$ exists. Further, $\gamma$ is a scale parameter having a positive value corresponding to a value referred to as a variance with respect to a Gaussian distribution. In this distribution, if $\beta$ is set to 1, positivity of a realized instance stochastically generated on the basis of the distribution function is ensured. The inventors of the present invention found that a one-dimensional $\alpha$-stable distribution of $\beta=1$ is capable of providing a root signal for providing suitable positivity to avoid occurrence of an error due to modeling of root signal. According to the present invention, parameters including $\alpha$ other than $\beta$ can be selected for adaptation to a particular use. To select parameters other than $\beta$, a method disclosed in a document by Kuruoglu (E. E. Kuruoαlu, "Densitv Parameter Estimation of Skewed $\alpha$-Stable Distributions," IEEE Trans. Signal Process., Vol. 49, No. 10, pp. 2192-2201, October 2001) can be used as an estimation method therefore. Also, parameters other than $\beta$ can be estimated based on experienced values that specific users know or by using functional prediction values obtained in a try and error manner. According to the present invention, a root signal can be generated by using any parameters as long as a one-dimensional $\alpha$-stable distribution of $\beta=1$ is used.

In step S22, j is incremented. In step S24, a random multiplier $A_{j,k}$ is computed with respect to each value of k in scale j. In step S26, a function $W_{j,k}$ to be used for wavelet analysis is formed. $A_{j,k}$ is a random variable converging to $[-1, 1]$ and symmetric about zero, and $U_{j0,k}$ and $A_{L,k}$ with respect to $L>j$ are independent of each other. For instance, a concrete example of implementation in which $A_{j,k}$ is given is a beta distribution.

In step S28, wavelet analysis is executed by using the following equations with respect to each value of k:

$$U_{j+1,2k} = 2^{-1/2}(U_{j,k} + W_{j,k})$$

$$U_{j+1,2k+1} = 2^{-1/2}(U_{j,k} - W_{j,k}) \quad \text{[Expression 6]}$$

In step S30, determination is made as to whether the value of j has become equal to n. If the value of j is smaller than n, j is incremented in step S32, branching to step S24 is performed, and processing from step S24 TO step S30 is repeated until j=n is satisfied.

If j=n is determined in step S30 (yes), the process advances to step S12 shown in FIG. 1 for execution of processing for filtering of high-frequency components and low-frequency components, and processing for extracting components corresponding to low-frequency components and high-frequency components from the results of generation of the signal pattern having multifractality is executed. In the present invention, processing capable of providing a multifractal signal pattern for providing a suitable long-tail distribution is not limited to the wavelet conversion shown in FIG. 2, and any method can be used if it is capable of executing processing equivalent to that shown in FIG. 2. In particular, in the present invention, a method of decomposition into an intermediate pattern by a general-purpose filter can be applied, for example, to the method proposed by Riedi et al.

FIG. 3 is a diagram showing an example of implementation in which processing for synthesizing wavelets in step S28 of the present invention is realized by a digital filter bank. As shown in FIG. 3, a filter bank usable in the present invention can be interpreted as a repetition structure using an arrangement (bank) of digital filters formed by using low-pass filters $g_0$ and high-pass filters $g_1$. From this viewpoint, $U_{j,k}$ can be regarded as an expression of low-frequency components in each scale, and $W_{j,k}$ can be regarded as an expression of high-frequency components in each scale. A symbol $\uparrow 2$ in FIG. 3 denotes zero interpolation such that the sampling rate is made twice as high.

Referring to FIG. 3, input values at the (j−1)th stage are $W_{j-1,k}$ and $U_{j-1,k}$ and these values are respectively input to the low-pass filter $g_0(n)$ and the high-pass filter $g_1(n)$ through zero interpolation means $\uparrow 2$ and input to an addition means (j−1)+ to be combined. An output value from the addition means (j−1)+ is used as an input $U_{j,k}$ at the next jth stage. The value of $W_{j,k}$ is input to another zero interpolation means in the jth stage. These values are respectively input to the low-pass filter $g_0(n)$ and the high-pass filter $g_1(n)$ and again input to an addition means (j)+ to be supplied as a new output signal $U_{j+1,k}$ to the (j+1)th stage. This digital filter bank is provided in a plurality of number of stages to enable synthesis of wavelets. The digital filter bank shown in FIG. 3 can be formed as hardware. Also, in a preferred mode of implementation of the present invention, the digital filter bank can be formed as software having the same functions.

The synthesized signal is a non-stationary time series having multifractality and not integrable along the time axis. Therefore, the frequency components cannot be defined with respect to the power spectrum, and a low-pass filter and a high-pass filter for a steady time series signal only have an approximate meaning for a non-stationary time series. According to the present invention, therefore, decomposition of components by a general-purpose filter capable of either of linear and nonlinear operations is performed as an example of implementation. An example used in this embodiment is a quadratic Volterra filter with mapping proposed in a document by Bernstein et al. (R. Bernstein, M. Moore, and S. Mitra, "Adjustable Quadratic Filters for Image Enhancement," Proc. IEEE ICIP' 97, Vol. 1, pp. 287-290, October 1997), and proved to have the effect of extracting high-change-rate components and to be capable of selecting the rate for extraction through a parameter. In a particular mode of implementation of the present invention, the result of subtraction of an output from the filter from the synthesized signal pattern is regarded as a low-change-rate component. Processing for normalization of the generated pattern is simultaneously performed.

Extraction of high-frequency components is performed, for example, by the following equations, but the following equations are not exclusively used.

$$x_p(n)=f(x(n))$$

$$y(n)=[x_p(n)]^2-[x_p(n-1)x_p(n+1)] \quad \text{[Expression 7]}$$

In the above equation, f represents a mapping function for the original signal x. As a mapping function in an example of implementation of the present invention, a function expressed by the following equation disclosed in the document by Bernstein et al. can be used. However, the present invention is not limited to the following equation.

$$f(x) = \begin{cases} 1-2(1-x)^2 & 0.5 < x \leq 1 \\ 2x^2 & 0 \leq x \leq 0.5 \end{cases} \quad \text{[Expression 8]}$$

According to the present invention, the above-described filtering processing is executed to separate high-frequency components and low-frequency components in the time-series pattern. An intermediate pattern is generated by this frequency component separation to enable the high-frequency components and the low-frequency components to be independently processed in ratios selected as desired.

Next, in the signal pattern generation method of the present invention, a method of recombining the components while changing the ratios of the measured amounts on the basis of an index such as the sum of the squares of signal values in an observation range can be used. For instance, in a more concrete example of implementation of the present invention, the signal pattern obtained from the root signal is separated into high-change-rate components, i.e., high-frequency components used in the present invention, and low-change-rate components, i.e., low-frequency components referred to in the description of the present invention, and the high-frequency components and low-frequency components are multiplied by the values realizing the ratio of the sums of the squares of the respective signal values to generate a resynthesized signal pattern. As a different concrete method for this resynthesis, a synthesis method selectable by those skilled in the art to achieve the same effect may be used, and the method described in connection with the concrete mode of implementation of the present invention is not exclusively used.

FIG. 4 is a diagram showing another mode of implementation of the signal pattern generation method of the present invention. In the mode of implementation shown in FIG. 4, the process starts from step S34 to generate a signal having multifractality with the long-tail distribution. High-frequency components and low-frequency components are separated in step S36 by using a general purpose filter (formed as a nonlinear filter or a linear filter). In step S38, the ratios of high-frequency components and low-frequency components are set by a suitable method, e.g., inputting by a user and are stored in a memory. In step S40, the ratios stored in the memory are respectively read out and signal pattern resynthesis can be performed by computing the intensities of low-rate components and high-rate components using the ratios input by the user, and by combining the components.

FIG. 5 is a diagram showing an original pattern actually obtained. In FIG. 5, the ordinate corresponds to access frequency and the abscissa represents time. As shown in FIG. 5, the actual access frequency increases abruptly from a state where the access frequency is low, and such an abrupt increase occurs with certain periodicity.

FIG. 6 is a diagram showing, in comparison with each other, a resynthesized signal pattern (a) generated by using a signal pattern generation apparatus of the present invention and a pattern (b) in a conventional art reported by Riedi et al. in which a Gaussian distribution is used as a root signal. In FIG. 6, the values of signal patterns respectively formed are shown and sampling points are indicated on the abscissa. The resynthesized signal pattern of the present invention shown in (a) of FIG. 6 was obtained by setting a coefficient for low-frequency components to 0.5 and setting a coefficient for high-frequency components to 1.5, as externally input values, respectively. As shown in FIG. 6, the amount of accumulated low-frequency components in the signal pattern generated by the method of the present invention as shown in (a) of FIG. 6 is smaller than that in the signal pattern of the conventional art shown in (b) of FIG. 6, and the pattern of the present invention is closer to the original pattern shown in FIG. 5. The reason for this difference is as explained below. In the method proposed by Riedi et al. and generating a pattern as shown in (b) of FIG. 6, positivity cannot be ensured and the actual root signal contains an error since a Gaussian distribution is used as a root signal. Also, errors are superimposed on the values corresponding to low-frequency components in the pattern generation process since wavelets are used.

FIG. 7 shows multifractality of a signal generated in the present invention by using a large-deviation multifractal spectrum. In FIG. 7, multifractality is indicated through the signal value on the ordinate and an Hölder exponent on the abscissa. In FIG. 7, the curve indicated by the dotted line is a curve obtained with respect to a signal pattern obtained by the method proposed by Riedi et al., while the curve indicated by the solid line represents multifractality in the case of the method of the present invention. As shown in FIGS. 7 and 6, in the signal pattern obtained by the method of the present invention provides substantially the same fractality as that from the signal pattern obtained by the conventional method and is effective in improving the reproducibility of the original pattern.

The significance of a generated signal pattern in a case where there is a need to ascertain, for example, the state of a queue in a system depends on whether the generated pattern has a distribution close to the original pattern as seen in each of different ranges as well whether the overall characters of the distribution are close to those of the original pattern. For examination in this respect, comparison was made between distributions in different ranges in the signal pattern obtained in the present invention. FIG. 8 is a diagram obtained by dividing the signal pattern shown in FIG. 6 into eight ranges along the abscissa and by sorting the intensities alternately in increasing order of intensity and decreasing order of intensity with respect to the ranges.

Symbols I to VIII shown in the figure indicate the ranges. The original pattern is shown in (a) of FIG. 8, and the signal pattern obtained in the present invention is shown in (b). In FIG. 8, distribution characteristics in short ranges are compared as distributions rearranged by sorting the intensities alternately in increasing order and decreasing order one range to another in the eight ranges equally divided. From (a) and (b) of FIG. 8, it can be said that the resynthesized signal pattern generated in accordance with the present invention is a generally satisfactory reproduction of the original pattern shown in (a) of FIG. 8.

FIG. 9 shows comparison between the same short-range distribution characteristics as those shown in FIG. 8 and the corresponding characteristics of the signal pattern obtained by the method proposed by Riedi et al. The original pattern actually measured is shown in (a) of FIG. 9, and the signal pattern generated by the method proposed by Riedi et al. is shown in (b). As shown in FIG. 9, in the case of the method by Riedi et al., accumulation of error in low-frequency components is observed and the intensity of low-frequency components that have the meaning defined in the present invention is increased in the distribution.

By using the patterns shown in FIGS. 8 and 9, the sum total of the absolute values of differences between the pattern according to the method by Riedi et al. and the original pattern was computed. The computed value was 544.30. The corresponding value was computed between the resynthesized signal of the present invention shown in FIG. 8 and the original pattern. The obtained value was 263.09. From the comparison between these values, it can be understood that the similarity of the pattern according to the present invention to the original pattern is also higher with respect to the short-range distributions. Simultaneously, the signal pattern according to the present invention has multifractality including a long-range dependence. Thus, it has been shown that a pattern stochastically/statistically close to an actually measured example can be generated by using the method in accordance with the present invention.

FIG. 10 is a schematic functional block diagram of a signal pattern generation apparatus of the present invention. The signal pattern generation apparatus 10 of the present invention is constituted by a root signal generation section 12, a random multiplier generation section 14, a high-frequency component generation section 16 for generating $W_{j,k}$ corresponding to high-frequency components in the present invention, a filter bank section 18, and a general-purpose filter section 20. The root signal generation section 12 generates a root signal by using a one-dimensional $\alpha$-stable distribution of $\beta=1$ and stores the root signal in a suitable memory not shown in the figure. The random multiplier generation section 14 randomly generates a value with respect to each value of k in scale j by using a beta distribution and stores the value, for example, in the form of array $A_{j,k}$ in the memory. The high-frequency component generation section 16 reads out the value of $A_{j,k}$ and the value of $U_{j,k}$ from the memory, computes $W_{j,k}$ and stores the computed $W_{j,k}$ in the memory.

The filter bank section 18 reads out, from a suitable area of the memory, the low-frequency components $U_{j,k}$ and the high-frequency components $W_{j,k}$ currently stored in the memory, computes $U_{j+1,k}$ with respect to each value of k and stores the computed value in a suitable memory area. The filter bank section 18 generates a wavelet signal by computation using the low-frequency components and the high-frequency components to a predetermined value and stores the wavelet signal in the memory. The value of the generated wavelet signal is read out by the decomposition section 20 constituted by a general-purpose filter, and the high-frequency components, the low-frequency components and the ratio of them are stored as a signal pattern in the memory. In the present invention, the random multiplier generation section 14, the high-frequency component generation section 16 and the filter bank section 18 constitute a statistically self similar signal generation section SSSSG (Statistically Self Similar Signal Generator) of the present invention.

The signal pattern generation apparatus 10 shown in FIG. 10 is further constituted by a coefficient acquisition section 22 and a resynthesis section 24. The coefficient acquisition section 22 reads out the results from the decomposition section 20 and computes a resynthesis signal pattern. In another example of implementation of the present invention, an arrangement for acquisition of coefficients can be adopted in which a user inputs coefficients, the input coefficients are stored in a suitable memory, and the coefficient acquisition section 22 reads out the stored coefficients. In this case, computation is performed so that a normalized resynthesized signal pattern can be provided and the coefficients are thereafter stored and read out to be used in the resynthesis section 24. The resynthesis section 24 multiplies the signal pattern of high-frequency components and the signal pattern of low-frequency components by the obtained coefficients, resynthesizes a signal pattern by adding the signal patterns together, and the resynthesized signal pattern in a memory 26 for storing the result. This memory 26 may be formed in a common memory by being combined with the memory for storing the above-described results.

FIG. 11 shows an example of implementation of a network endurance testing system using a signal pattern synthesis apparatus of the present invention. The network endurance testing system 30 shown in FIG. 11 is constituted by a signal pattern generation section 32 using the signal pattern generation method of the present invention. And the network endurance testing system of the present invention is constituted by an information processing section 34 such as a server capable of offering a Web service, a Web application, etc., through a network, e.g., the Internet, a LAN or a WAN.

The signal pattern generation section 32 is connected to an access request generation section 36 capable of generating an access request in accordance with a predetermined communication protocol to the information processing section 34. The access request generation section 36 is constituted by a signal pattern storage section 36a which receives and stores signal patterns generated by the signal pattern generation section 32, and an access request generation section 36b capable of generating access requests with a frequency (the number of accesses/time) according to the value of each stored signal pattern.

On the other hand, the information processing section 34 is formed so as to include a network interface card or board 38. In the example of implementation shown in FIG. 11, the information processing apparatus 34 is connected to the access request generation section 36. For this connection, a pseudo network configuration using a communication protocol, e.g., a suitable TCP/IP or a UDP/IP which can be set as desired by a user may be adopted. Alternatively, a connection in a RAW mode or the like may be made to enable in-situ testing at a site managing the information processing section. The information processing section 34 is in such a state as to be able to receive a pseudo access request corresponding to the signal pattern in accordance with the present invention and start a piece of application software for offering a Web service, a Web application or the like.

A user of the network endurance testing system 30 inputs coefficients to the signal pattern generation section 32 if necessary by an external input means, a coefficient generator or the like. The signal pattern generation section 32 generates a desired resynthesis signal pattern and sends the desired pattern to the access request generation section 36. The access request generation section 36 generates an access frequency of a suitable rate from a signal value of the received resynthesis signal pattern, and sends an access request to the information processing section 34. The information processing section 34 receiving the access request starts a software such as WWW browser to initiate processing according to the access request. The information processing section 34 typified by a server can be formed so as to include an unillustrated storage section for storing a log of access requests.

In the present invention, the user can determine the network endurance of the server without setting up the actual network connection, by outputting the access log and monitoring the state of processing after execution of a network endurance test in the system. In another example of implementation of the network endurance testing method of the present invention, the access log is displayed in real time to enable faster feedback.

On the other hand, in other examples of implementation, the information processing section 34 may be arranged so to actually execute a Web service, a piece of Web application or the like and to transfer execution results to a transmission buffer or the like, and may be arranged to actually send back execution results in real time, for example, to the access request generation section 36 to form a pseudo network transaction. Referring to FIG. 11, the server, i.e., the information processing section 34, is given a fixed IP address xxx.ooo.ab-c.def, and an access request is transmitted by setting a destination at the IP address assigned to the information processing section 34. If a mode of implementation in which execution results are returned to the access request generation section 36 is adopted, the information processor 34 may be arranged to send back execution results to the IP address of the address request generation section 36 or by broadcast addressing or the like.

Since a user can set coefficients in the signal pattern generation section 32 of the present invention as described above, the user may generate, on the basis of his/her experience, an access pattern relating to a problem or the like which occurred previously, thus enabling the network endurance of the information processing section 34 typified by a server to be simulated without being connected to an actual network such as the Internet. Further, the same arrangement of the signal pattern generation section 32 of the present invention ensures that the capacity planning and the endurance in a long-time operable environment of the Web server can be simulated in advance. Further, the present invention can be applied in wide ranges of performance prediction, diagnosis, tuning, designing, etc., of network systems, including traffic trouble and performance tests at the time of grid computing, a test of firewall software, and a test of reliability of an apparatus.

The example of implementation of the network endurance testing system shown in FIG. 11 has been described by assuming that a configuration in which the signal pattern generation section 32, the access request generation section 36 and the information processing section 34 are formed as separate sections is adopted. According to the present invention, however, the above-described components may be formed in advance as software modules included in a Web server or the like to be included in an information processing section (server) to be tested.

While particular modes of implementation of the present invention shown in the drawings have been described, the present invention is not limited to the particular modes of implementation described. The pattern generation method and apparatus of the present invention can be formed as a functional module realized by executing a program on a computer. Examples of a programming language for such a program are the assembler language, FORTRAN, C language, C+ language, and Java®. The program executable on a computer to execute the method of the present invention can be distributed by being stored on a ROM, EEPROM, a flash memory, a CD-ROM, a DVD, a flexible disk, a hard disk or the like.

The present invention makes it possible to provide a signal pattern generation apparatus capable of performing suitable processing even when an abrupt increase in the number of accesses occurs while the number of accesses is large, having an adequate long-tail characteristic, and capable of providing adequate fractality with respect to a plurality of ranges with respect to time and providing a suitable short-range distribution characteristic, a signal pattern generation method capable of providing such characteristics, a program for making a computer system execute the signal pattern generation method, a computer-readable storage medium on which the program is stored, a network endurance testing system, and a network endurance testing method. While the present invention has been described with respect to the concrete modes of implementation with reference to the drawings, the present invention is not limited to the modes of implementation shown in the drawings and it should be understood by those skilled in the art that various modifications and changes including addition and removable of components can be made in the described modes of implementation.

DESCRIPTION OF SYMBOLS

Figure 1:
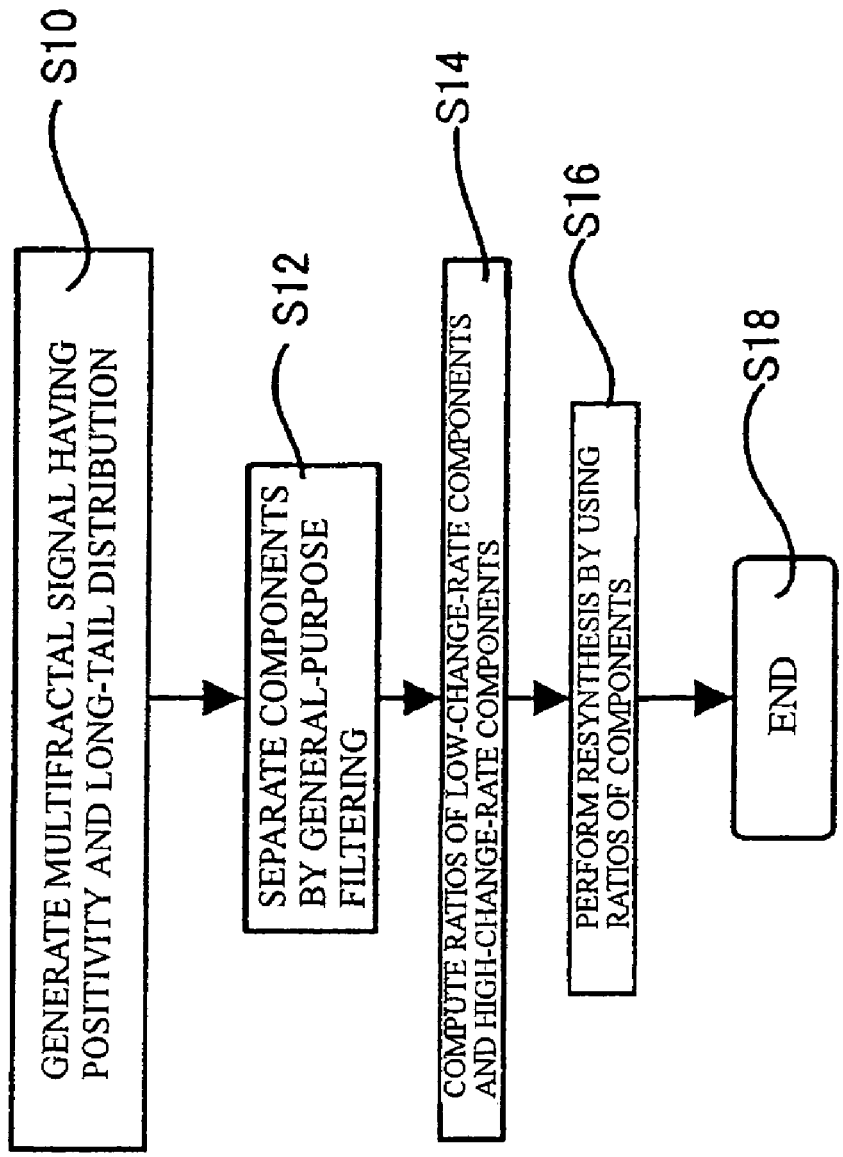
FIG. 1 is a flowchart in which a signal pattern generation method of the present invention is outlined.
Figure 2:
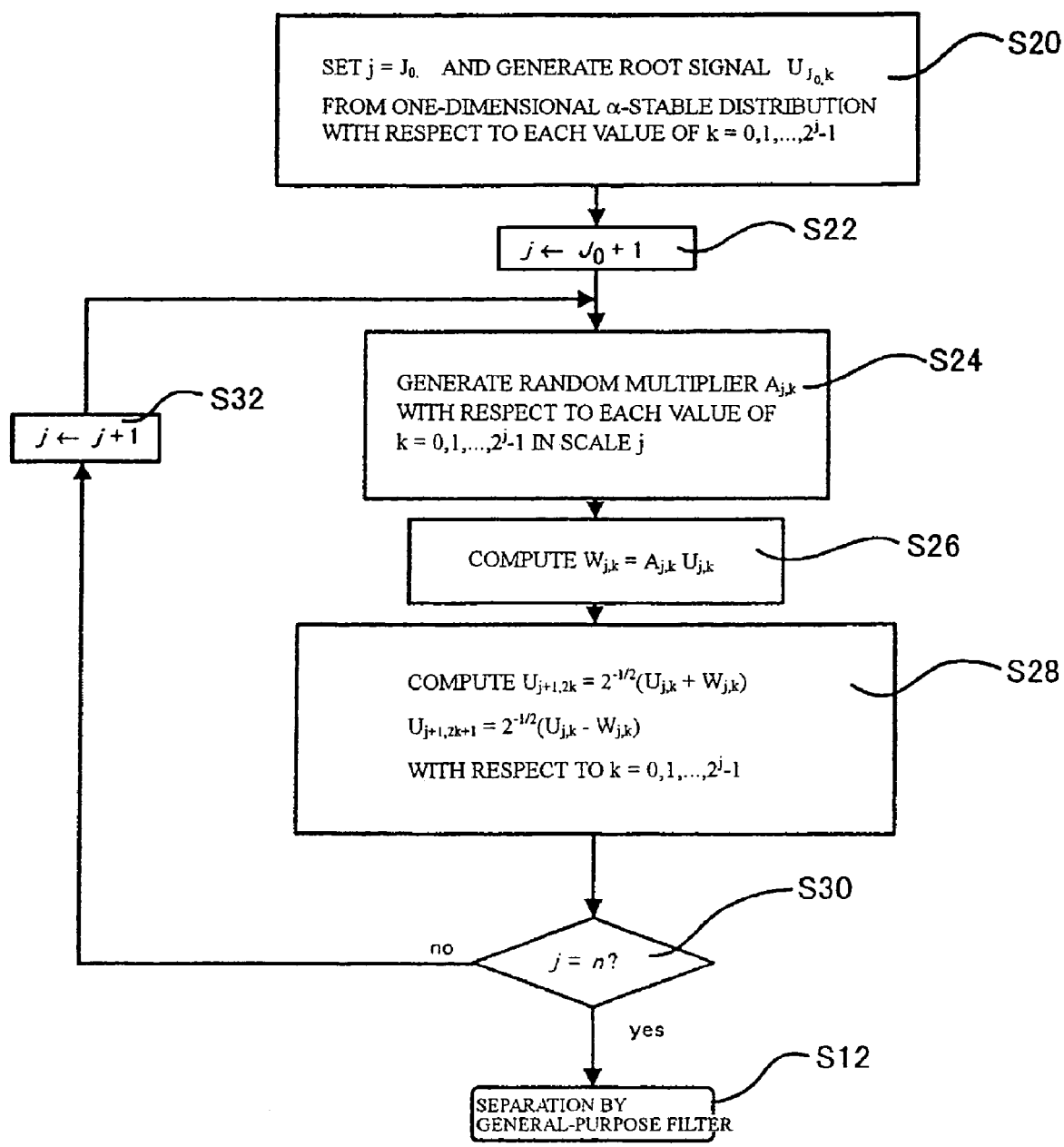
FIG. 2 is a flowchart usable to generate a fractal signal of the present invention.
Figure 3:
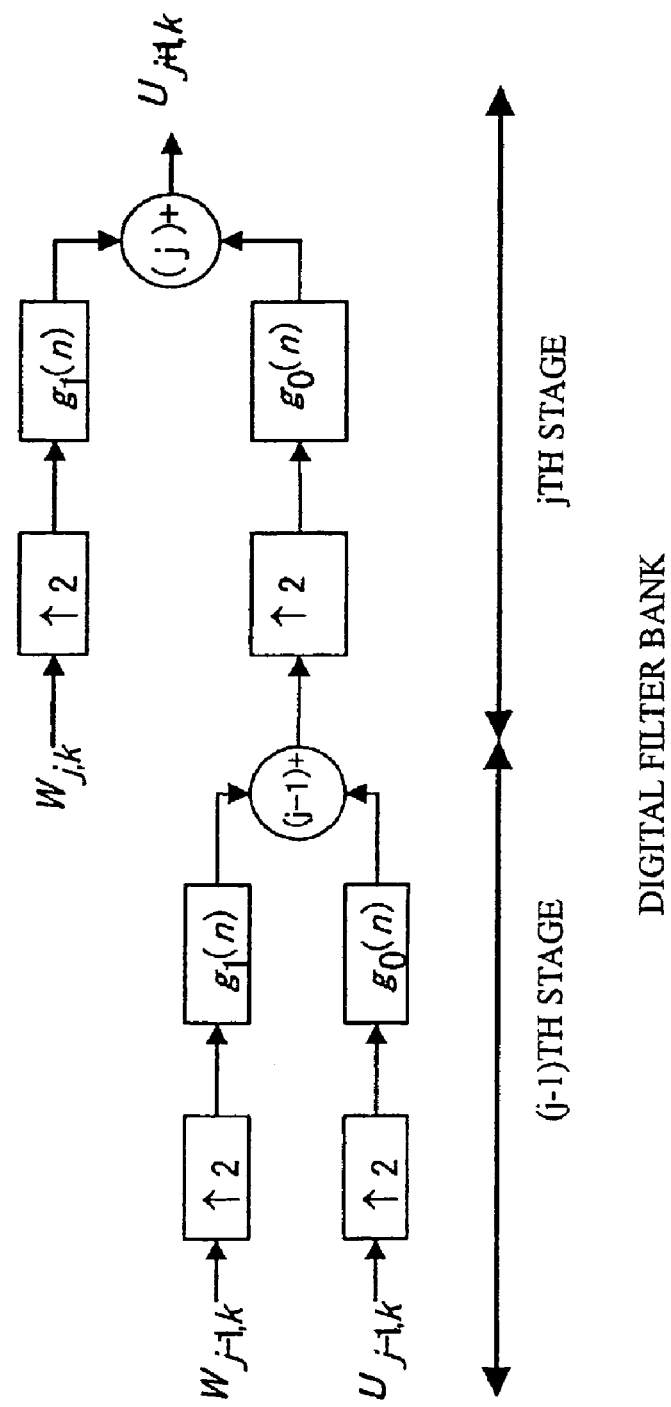
FIG. 3 is a diagram showing an example of implementation in a case where processing for synthesizing wavelets is realized by a digital filter bank.
Figure 4:
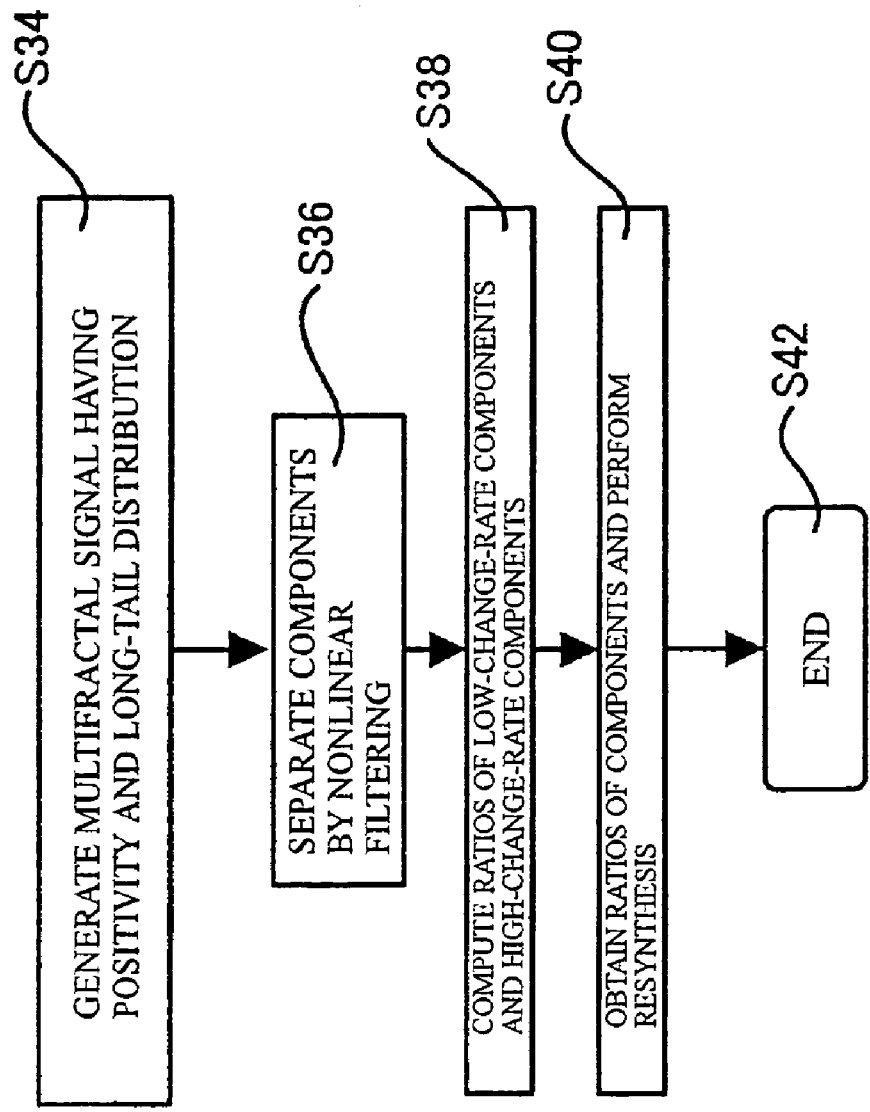
FIG. 4 is a flowchart in which another mode of implementation of the signal pattern generation method of the present invention is outlined.
Figure 5:
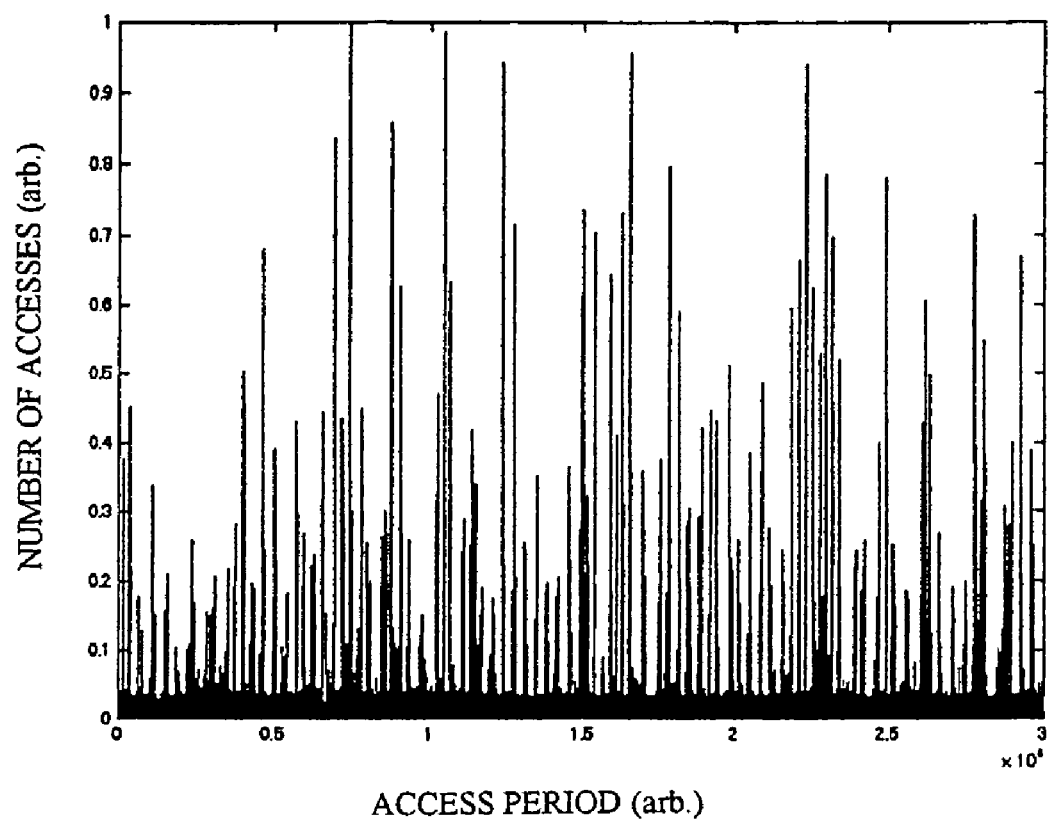
FIG. 5 is a diagram formed by outputting actually measured access frequencies with respect to time.
Figure 6:
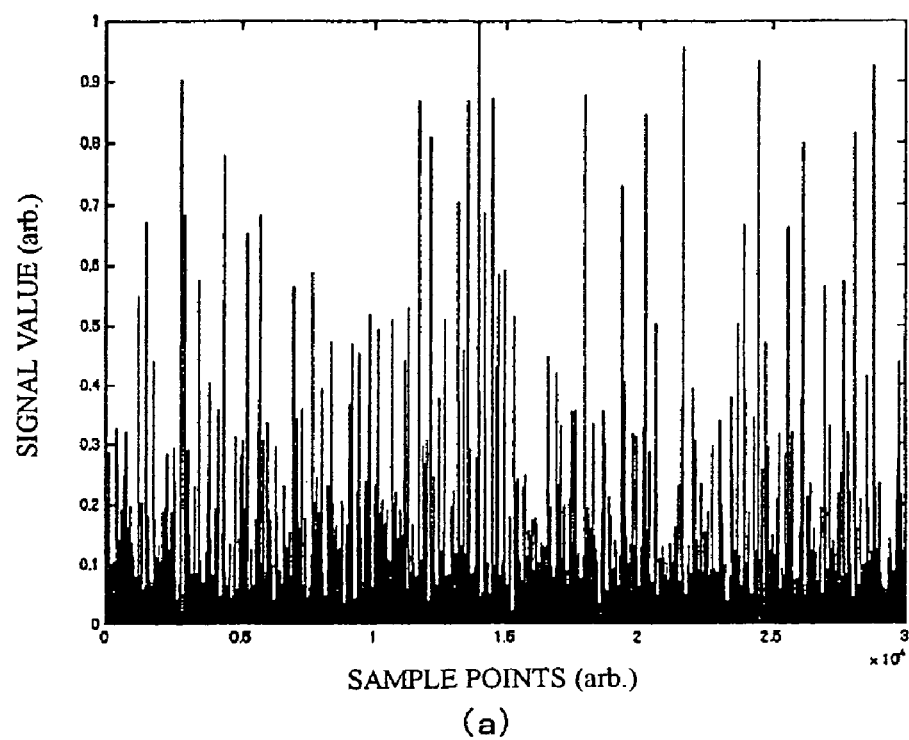
FIG. 6 is a diagram showing, in comparison with each other, a resynthesized signal pattern generated in accordance with the present invention and a pattern provided by a conventional simulation.
Figure 6:
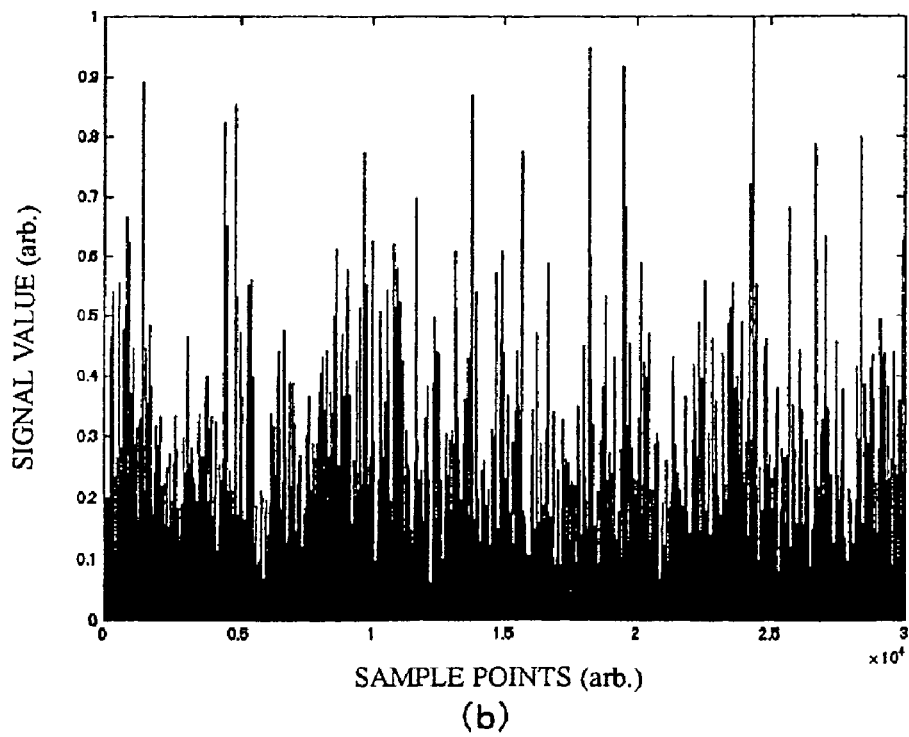
Figure 7:
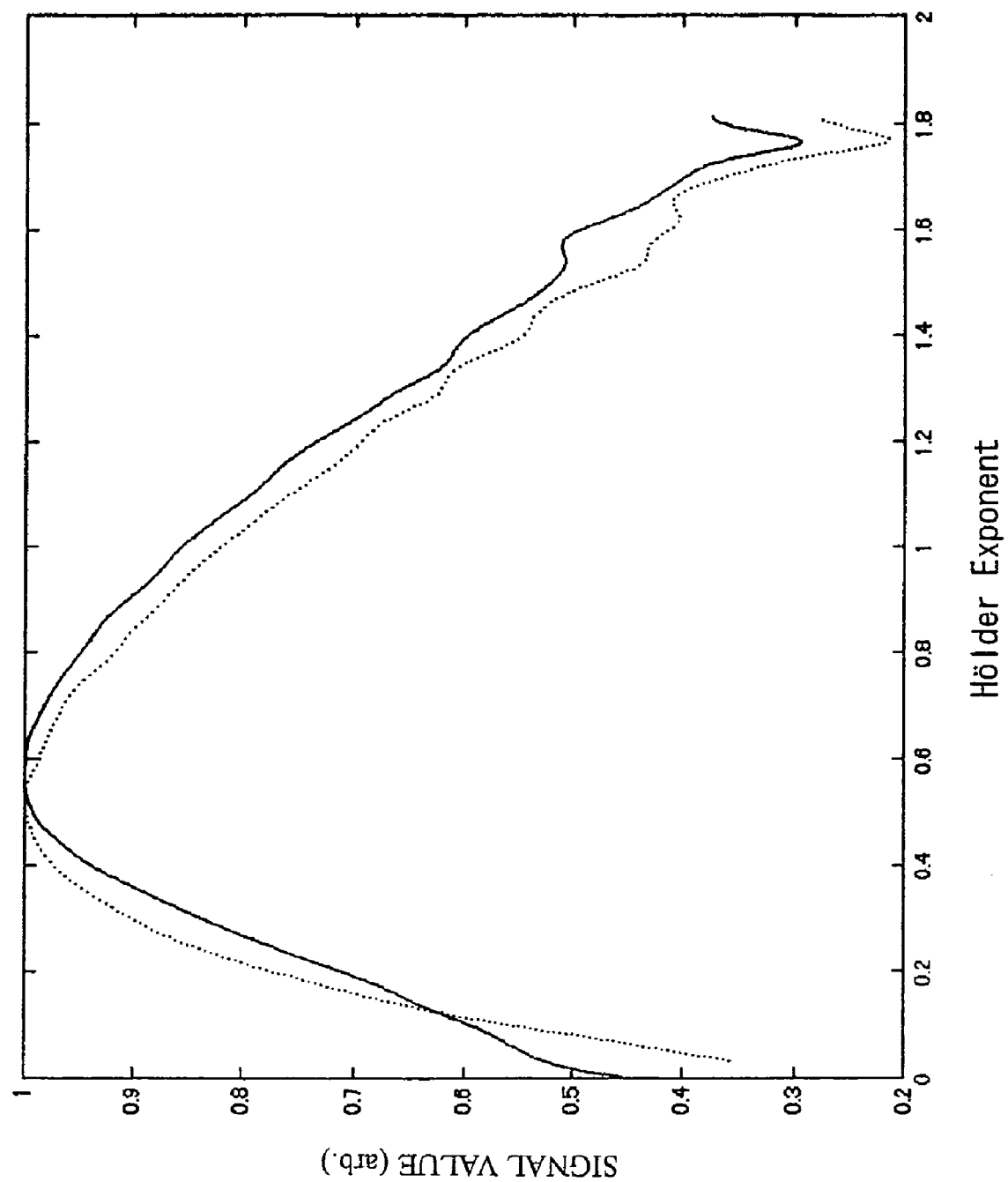
FIG. 7 is a diagram showing multifractality in the present invention.
Figure 8:
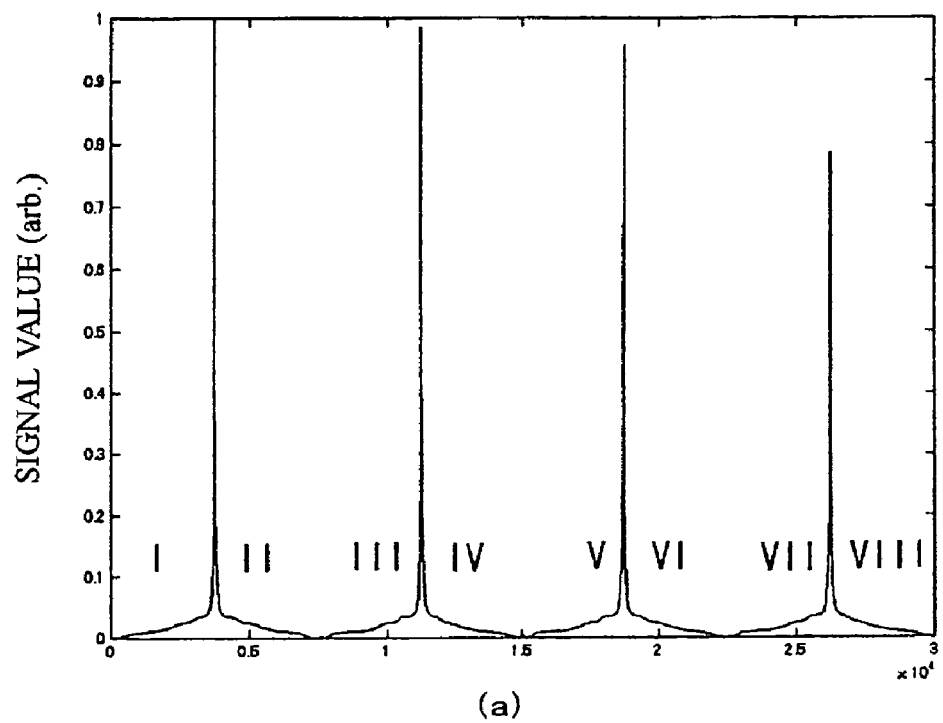
FIG. 8 is a diagram showing a distribution of signal values of a resynthesized signal pattern in the present invention by sorting the signal values in increasing order of intensity and decreasing order of intensity with respect to ranges.
Figure 8:
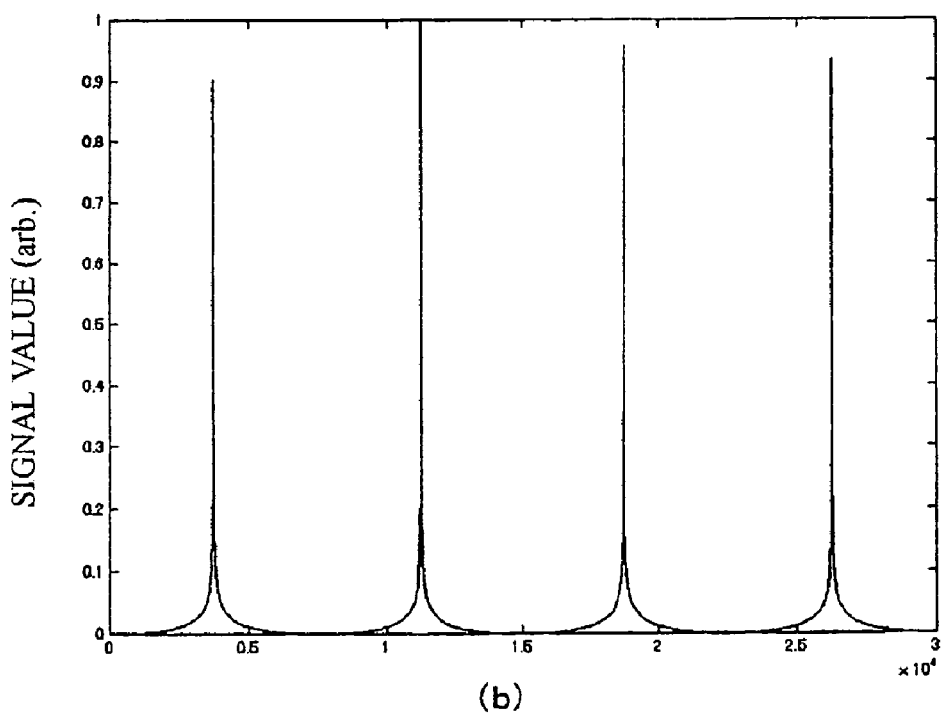
Figure 9:
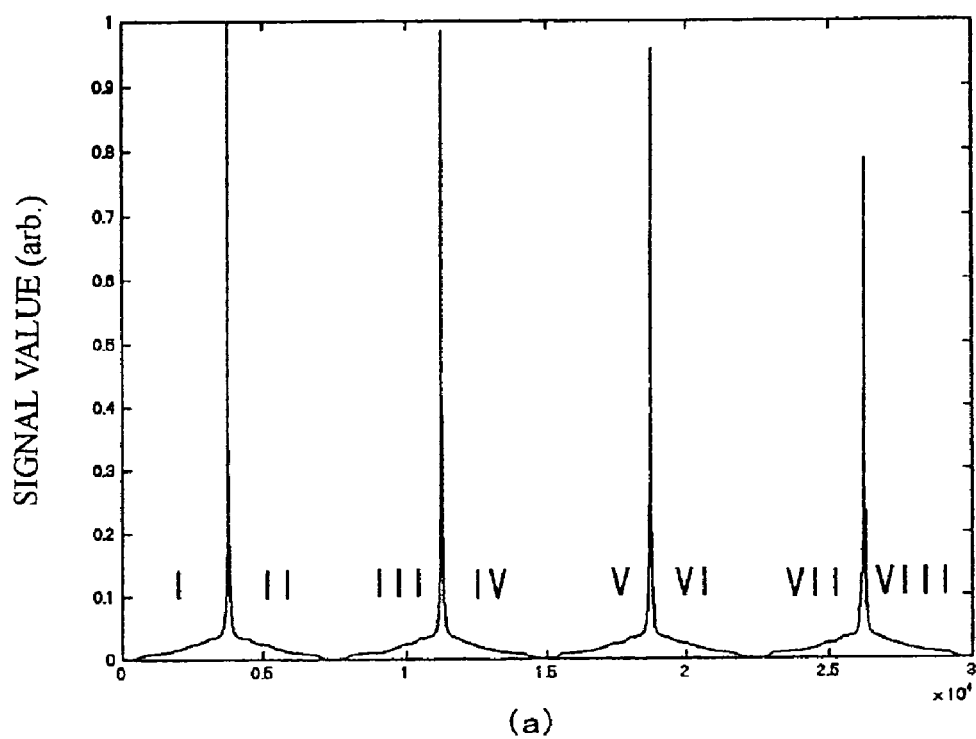
FIG. 9 is a diagram showing a distribution of signal values of a conventional signal pattern by sorting the signal values in increasing order of intensity and decreasing order of intensity with respect to simulation ranges.
Figure 9:
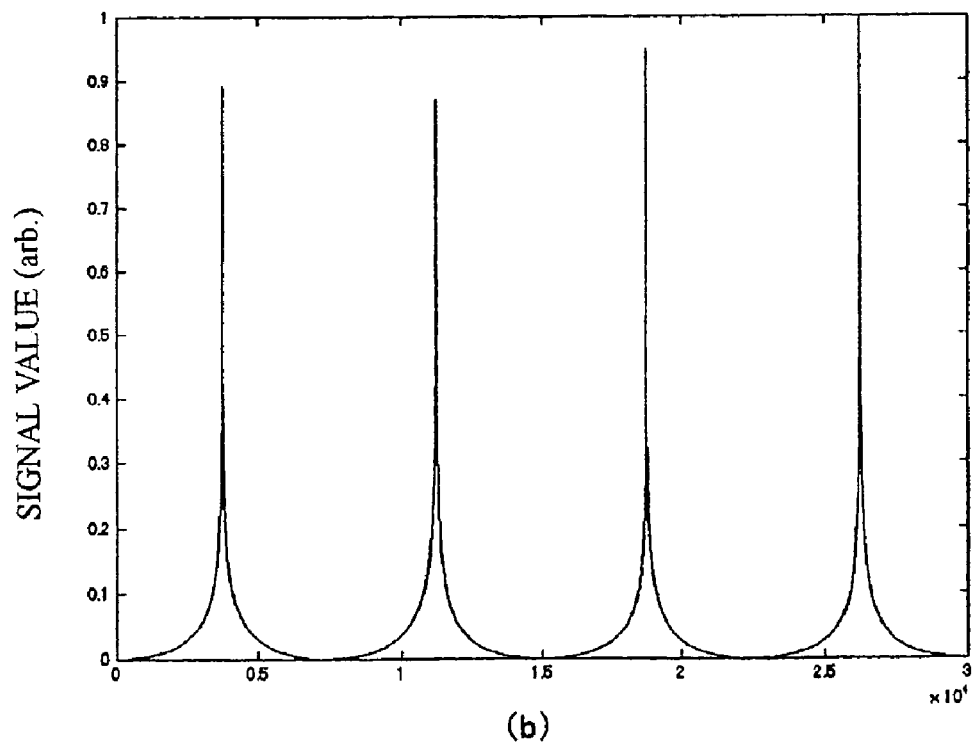
Figure 10:
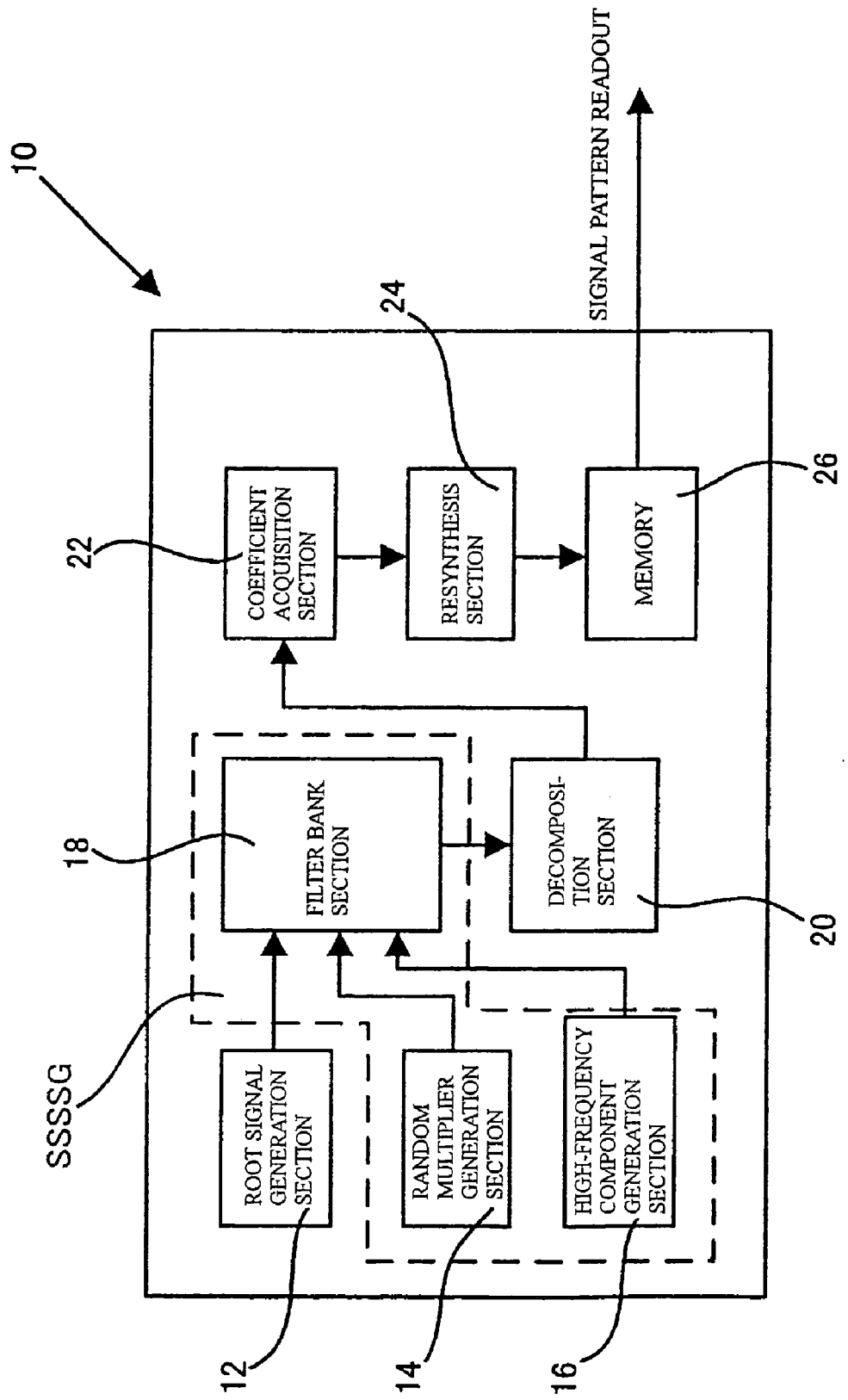
FIG. 10 is a schematic functional block diagram of a signal pattern generation apparatus of the present invention.
Figure 11:
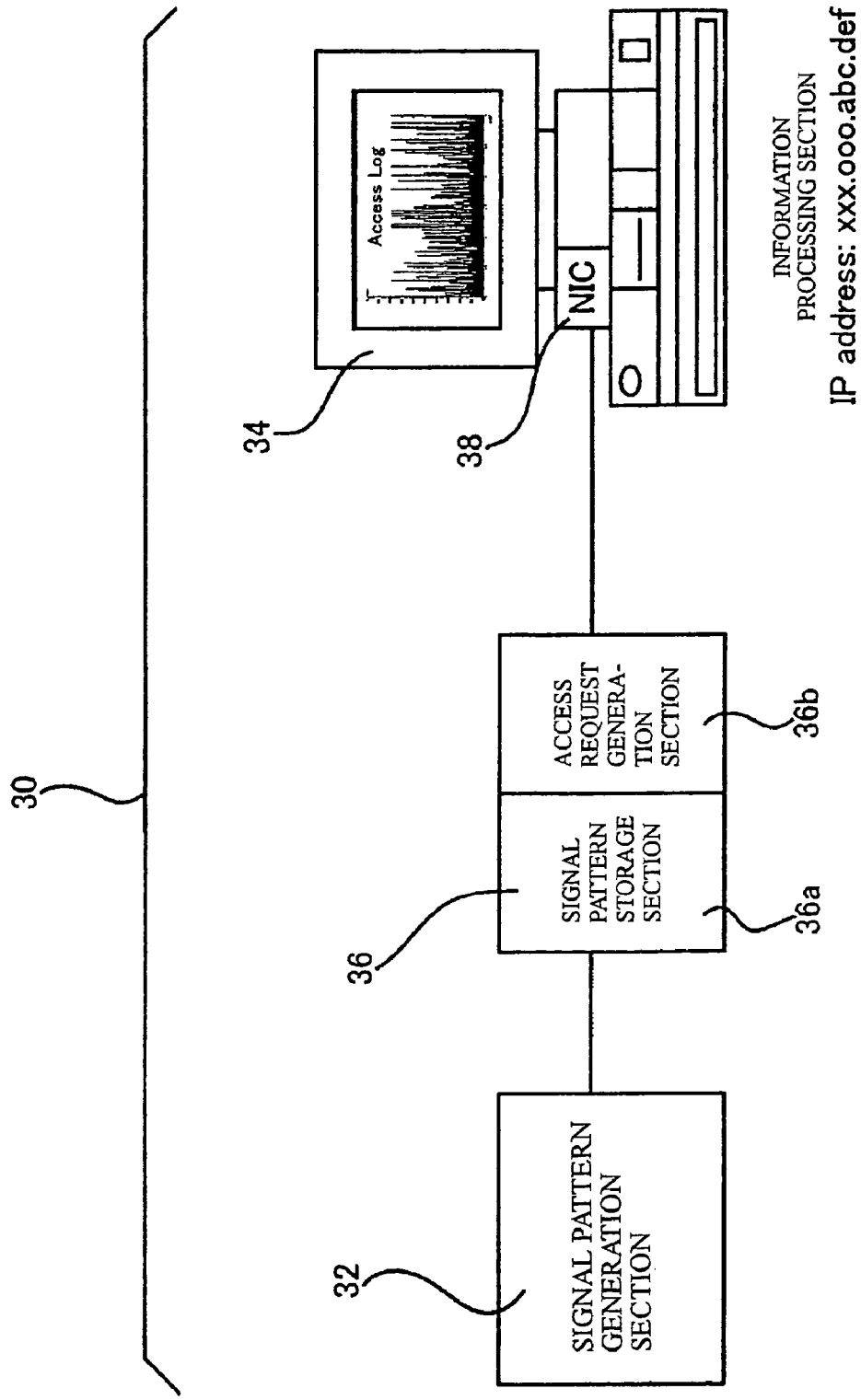
FIG. 11 is a diagram schematically showing the configuration of a network endurance testing system of the present invention.
Figure 12:
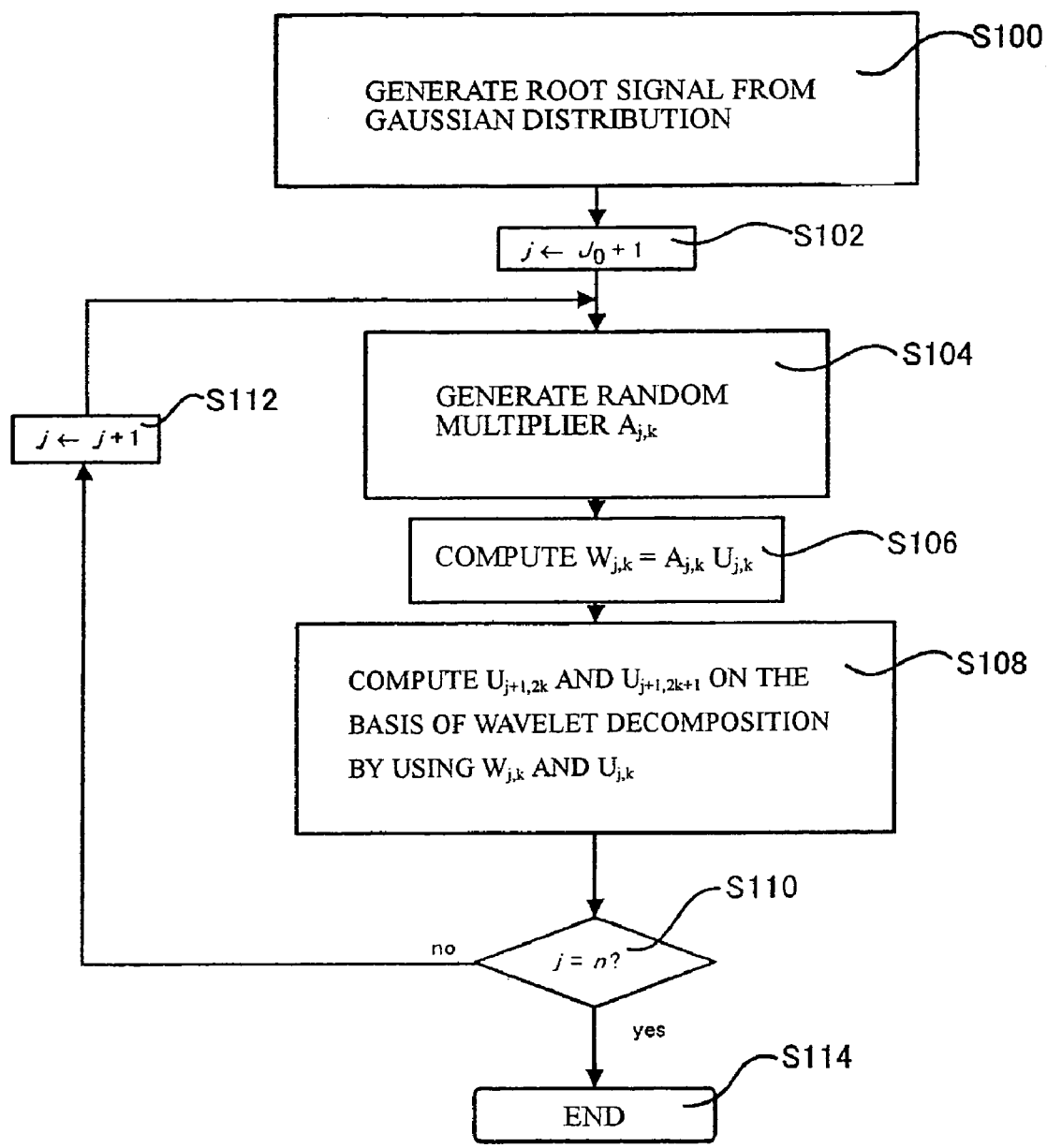
FIG. 12 is a flowchart showing processing for generating a conventional statistical self-similarity signal.

10 . . . Signal pattern generation apparatus
12 . . . Root signal generation section
14 . . . Random multiplier generation section
16 . . . High-frequency component generation section
18 . . . Filter bank section
20 . . . Decomposition section
22 . . . Coefficient acquisition section
24 . . . Resynthesis section
26 . . . Memory
30 . . . Network endurance testing system
32 . . . Signal pattern generation section
34 . . . Information processing section
36 . . . Access request generation section

The invention claimed is:

1. A signal pattern generation apparatus to generate a signal pattern having statistical self-similarity, said apparatus comprising:
a root signal generation section to generate a root signal having positivity using a one-dimensional alpha-stable distribution of beta equals to one;
a statistical self-similarity signal generation section to generate a statistical self-similarity signal based on wavelet analysis from the root signal;
a decomposition section which decomposes, using a general-purpose filter, the statistical self-similarity signal into an intermediate pattern comprising at least two components in different frequency regions;
a coefficient acquisition section which obtains coefficients for said at least two components, wherein the coefficients represent a ratio of the components;
a resynthesis section to generate a resynthesized signal pattern from said at least two components and said coefficients;
an access request generation section which receives the resynthesized signal pattern generated from said resynthesis section and generates a time-series access request; and
an information processing section which receives said time-series access request from said access request generation section, executes processing according to said time-series request, and stores an execution log.

2. The signal pattern generation apparatus according to claim 1, wherein said statistical self-similarity signal generation section is formed so as to include a filter bank section formed in a software or hardware manner.

3. The signal pattern generation apparatus according to claim 1, wherein said general-purpose filter comprises a non-linear filter.

4. The signal pattern generation apparatus according to claim 1, wherein said coefficient acquisition section includes means of storing coefficients computed from at least one of: ratios of the at least two intermediate patterns, and coefficients externally input.

5. The signal pattern generation apparatus according to claim 1, wherein said access request generation section converts a signal value of said received resynthesized signal pattern into an access frequency.

6. The signal pattern generation apparatus according to claim 1, wherein said information processing section is a server which offers a Web service or a Web application in response to a second access request sent to a predetermined IP address.

7. A signal pattern generation method in which a computer is controlled to generate a signal pattern having statistical self-similarity, said method causing the computer to execute:
a step of generating a root signal having positivity using a one-dimensional alpha-stable distribution of beta equals to one;
a step of generating a statistical self-similarity signal based on wavelet analysis from the root signal;
a step of decomposing, using a general-purpose filter, the statistical self-similarity signal into an intermediate pattern comprising at least two components in different frequency regions;
a step of obtaining coefficients for said at least two components, wherein the coefficients represent a ratio of the components;
a step of generating a resynthesized signal pattern from said at least two components and said coefficients; and
a step of generating a time-series access request from the resynthesized signal pattern;
a step of executing processing according to the time-series request; and
a step of storing an executing log.

8. The signal pattern generation method according to claim 7, wherein said general-purpose filter comprises a non-linear filter.

9. The method according to claim 7 further comprising:
a step of converting a signal value of a received signal pattern into an access frequency.

10. A non-transitory computer-readable storage medium tangibly embodying a computer readable program code having computer readable instructions which when implemented, cause a computer to carry out the steps of a method comprising:
generating a root signal having positivity using a one-dimensional alpha-stable distribution of beta equals to one;
generating a statistical self-similarity signal based on wavelet analysis from the root signal;

decomposing, using a general-purpose filter, the statistical self-similarity signal into at least two intermediate patterns in different frequency regions;

obtaining coefficients for the proportions of components of the said at least two intermediate patterns, wherein the coefficients represent a ratio of the components; and generating a resynthesized signal pattern from the two intermediate patterns and the coefficients;

generating a time-series access request from the resynthesized signal pattern;

executing processing according to the time-series request; and storing an executing log.

* * * * *